United States Patent [19]

Clark et al.

[11] Patent Number: 4,505,054
[45] Date of Patent: Mar. 19, 1985

[54] MAGNETIC SENSOR MOUNTING SYSTEM

[75] Inventors: Russell L. Clark, Zeeland; David E. Nestell, Wyoming, both of Mich.

[73] Assignee: Prince Corporation, Holland, Mich.

[21] Appl. No.: 498,104

[22] Filed: May 25, 1983

[51] Int. Cl.³ .............................................. G01C 17/28
[52] U.S. Cl. ............................................... 33/357; 33/361
[58] Field of Search ............ 33/347, 356, 357, 355 R, 33/364, 361, 362, 359, 352

[56] References Cited

U.S. PATENT DOCUMENTS

| | | | |
|---|---|---|---|
| 1,556,557 | 10/1925 | Paemelaere | 33/352 |
| 2,056,715 | 10/1936 | Dinsmore | 33/364 |
| 2,132,168 | 10/1938 | Klein et al. | 33/359 |
| 2,177,218 | 10/1939 | Klein et al. | 33/359 |
| 2,852,859 | 9/1958 | Depp . | |
| 2,903,798 | 9/1959 | Taylor | 33/364 |
| 3,903,610 | 9/1975 | Heaviside et al. . | |
| 3,991,361 | 11/1976 | Mattern et al. . | |
| 4,030,204 | 6/1977 | Edwards . | |
| 4,277,751 | 7/1981 | Lawson et al. . | |
| 4,309,828 | 1/1982 | Sakamoto . | |
| 4,373,271 | 2/1983 | Nitz | 33/361 |
| 4,425,717 | 1/1984 | Marcus | 33/361 |
| 4,429,469 | 2/1984 | Tsushima et al. | 33/356 |

*Primary Examiner*—William D. Martin, Jr.
*Attorney, Agent, or Firm*—Price, Heneveld, Huizenga & Cooper

[57] ABSTRACT

Mounting structure for a flux-gate sensor used in electrical digital compass for a vehicle includes a cradle assembly for pivotally mounting the sensor for adjustable movement in a vertical plane aligned with the longitudinal axis of a vehicle. A housing includes an arm engaging the cradle assembly for automatically pivoting the sensor to a horizontal position when installed in different vehicles.

21 Claims, 11 Drawing Figures

MAGNETIC SENSOR MOUNTING SYSTEM

BACKGROUND OF THE INVENTION

The present invention relates to an electrical compass system for a vehicle and particularly a mounting system for a magnetic sensor used in connection with the compass.

In recent years, digital electronics technology has been employed in the automotive industry to provide, for example, the display of speed and engine operating parameters to the vehicle user.

Typically, vehicle mounted compasses have been mechanical types with rotating compass cards located in a viscous damping media and attached to the vehicle dashboard. U.S. Pat. No. 4,309,828 discloses such a mechanical compass for mounting to a rearview mirror of a vehicle. An electrical compass using a flux-gate sensor has been described in a 1980 SAE paper entitled *Magnetic Field Sensor and Its Application to Automobiles* by Hisatsugu Itoh, SAE/SP-80/458. The sensor includes a suction cup for windshield mounting. U.S. Pat. No. 4,030,204 discloses a vehicle automotive compass in which Hall effect sensors are employed and which suggest floating the sensor in a fluid and locating it spaced from ferromagnetic material. Thus, in the past, it has been thought necessary to isolate the magnetic sensor of a vehicle compass system from the steel material of the vehicle.

SUMMARY OF THE PRESENT INVENTION

The system of the present invention provides an electrical digital compass for use in a vehicle which includes a flux-gate sensor and mounting structure. The mounting structure includes a cradle assembly for pivotally mounting the sensor for adjustable movement in a vertical plane aligned with the longitudinal axis of a vehicle. A housing includes means engaging the cradle assembly for automatically pivoting the sensor to a horizontal position when installed in different vehicles.

In a preferred embodiment of the invention, the cradle assembly is mounted to a circuit board, in turn, mounted to the housing to position the flux-gate sensor in proximity with the metal roof of a vehicle which serves to direct the magnetic flux lines of the earth's magnetic field in a manner to improve the sensor's performance.

These and other features, advantages and objects of the present invention will become apparent upon reading the following descriprion thereof together with reference to the accompanying drawings in which:

DETAILED DESCRIPTION OF THE PREFERRED EMBODIMENT

Figure 1:
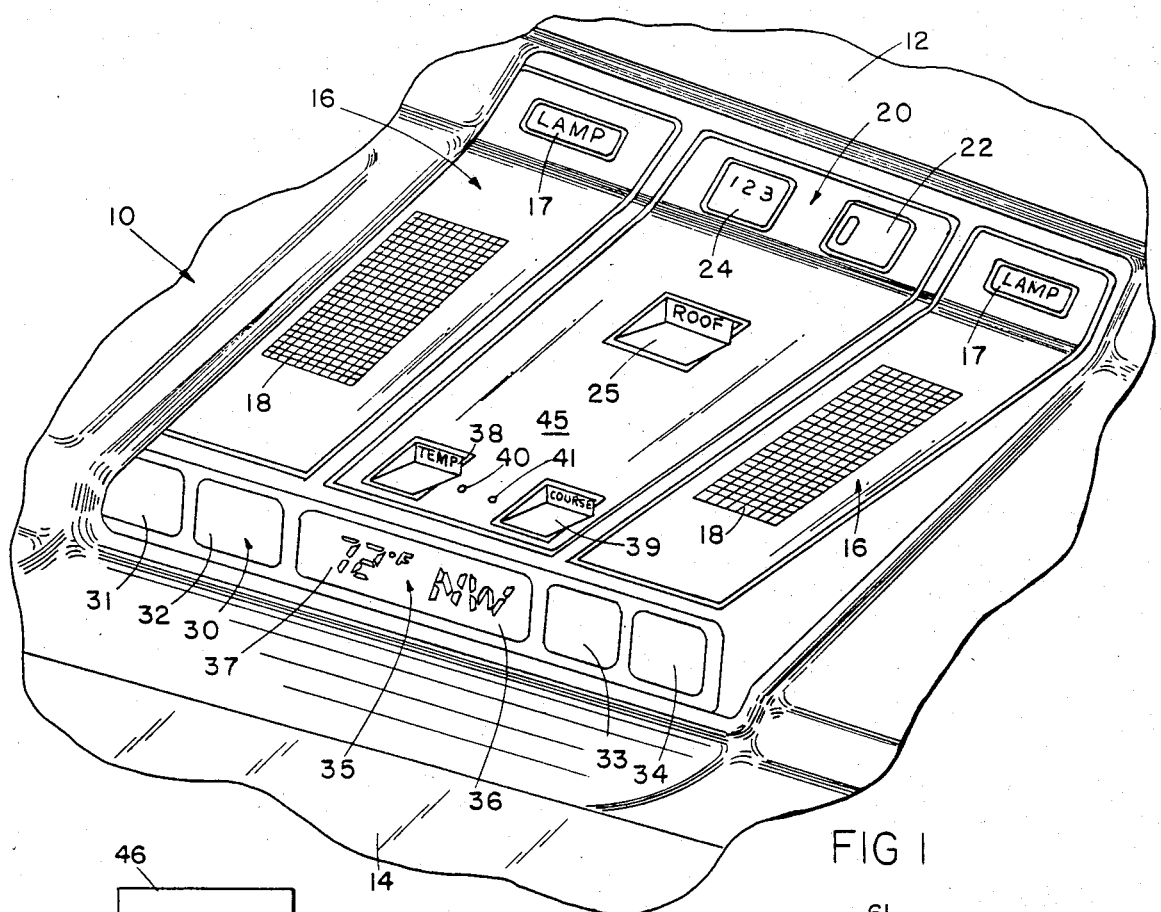
FIG. 1 is a fragmentary, perspective view of a compass display and control module embodying the present invention.

Referring initially to FIG. 1, there is shown a compass control and display module 10 which is adapted to be integrally included in a vehicle during manufacturing, although it could be separately added at a later time. The module 10 is positioned in the roof 12 of a vehicle and centered near the top edge of windshield 14, typically just above the rearview mirror. Module 10 includes a pair of map reading lamps 16 having switches 17 for operating lamp means positioned behind lenses 18 which direct illumination into the lap area of either the driver or passenger side of the vehicle, depending on which switch is actuated. The center of the module includes a garage door opening transmitter 30 including a three-position switch 22 for actuating any one of three different garage door remote control units by the actuation of push-button switch 24. Module 10 may also include an electrical sunroof control switch 25 if the vehicle is so equipped. The construction of the lamp modules 16 and garage door transmitter module 20 is disclosed in detail in U.S. Pat. No. 1,241,870, issued Dec. 30, 1980.

Module 10 additionally includes a separate display panel 30 which includes display indicators 31, 32, 33 and 34 for displaying vehicle operating parameters such as engine temperature, oil pressure, generator and fuel warning or the like which can either be displayed in a digital alpha-numeric format or as warning lights. The center of display module 30 includes a digital display 35 providing, in one embodiment of the present invention, an octant display 36 of the vehicle heading in an alpha format and on the left side of display 35, a temperature display 37 providing fahrenheit or centigrade display of the exterior ambient temperature of the air near the vehicle as well as a warning signal when road conditions approach freezing. The temperature display circuit is acutated by a push-button temperature switch 38 while the compass circuit is actuated by a push-button switch 39. A pair of apertures 40 and 41 provide limited access to calibrate and compensation switches 42 and 44, respectively (FIG. 2), which are only occasionally used and are push switches mounted to a circuit board 88 (FIG. 3) positioned within housing assembly 100 located above and behind facia panel 45 and are actuated by a pointed instrument such as a ball point pen. Thus, module 10 incorporates, at a single overhead location conveniently positioned for operator use, a control and information display center for the vehicle.

Figure 2:
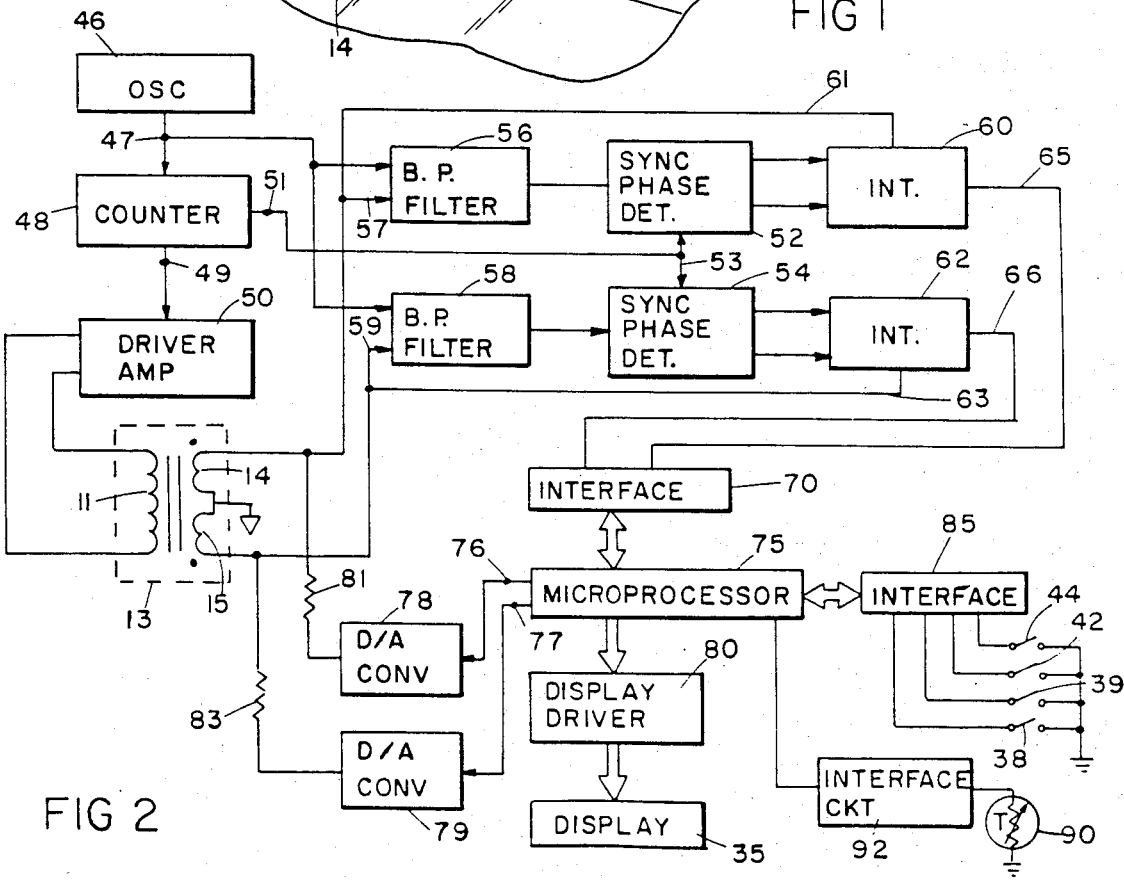
FIG. 2 is an electrical circuit diagram, partially in block and schematic form, of a compass system embodying the present invention.

As shown in FIG. 2, the compass and temperature display system includes an oscillator 46 which, in the preferred embodiment, is an R-C oscillator having an output frequency of approximately 100 kHz at output terminal 47 thereof. The ourput signal from oscillator 46 is applied to a counter circuit 48 providing 500 Hz at output terminal 49 which is applied to a driver amplifier 50 which subsequently applies the 500 Hz signals to excitation winding 11 of a conventional flux-gate sensor 13. Counter 48 also provides a 1 kHz signal at output terminal 51 which is applied to synchronous phase detector circuits 52 and 54. The output terminal 47 of oscillator 46 is also coupled to clock input terminals of digital bandpass filters 56 and 58. Filters 56 and 58 also include signal input terminals 57 and 59, respectively, coupled to one end of sensing coils 14 and 15 of sensor 13, as shown in FIG. 2, with the remaining terminals of coils 14 and 15 commonly coupled to a floating ground.

The output of bandpass filters 56 and 58 are coupled to the input terminals of synchronous phase detectors 52 and 54 such that second harmonic frequency signals are applied to each of the synchronous phase detectors which are actuated by an enabling signal from counter 48 via an enabling line 53 to apply positive and negative half-cycle sinusoidal signals received from sensing coils 14 and 15 through bandpass filters 56 and 58 to integrating and inverting amplifier circuits 60 and 62. The closed loop gain of the system is controlled through a feedback path including conductors 61 and 63 extending between integrating amplifier 60 and flux-gate sense winding 14 and integrator 62 and flux-gate sense winding 15, respectively. At the output terminals 65 and 67 of integrators 60 and 62, respectively, there is provided DC varying signals $e_1$ and $e_2$, respectively, which represent the direction information from sensing coils 14 and 15. The amplitude and polarity of $e_1$ and $e_2$ varies with vehicle direction with respect to the earth's magnetic field. These DC varying signals are applied to a suitable interface circuit 70, including for example, suitable amplifiers and an A/D converter for converting the DC signal information to digital signals. Circuit 70, in turn, is coupled to a microprocessor 75 which includes associated RAM and ROM memories with the ROM programmed to mathematically derive an output control signal in the form of the arc tangent of the ratio $e_1/e_2$. The microprocessor provides a digital output control signal applied to a display driver circuit 80 for displays 35 such that octant direction and temperature information can be displayed to the vehicle operator. The processing of signals $e_1$ and $e_2$ from integrator circuits 60 and 62 by the microprocessor and program to provide the $\tan^{-1} e_1/e_2$ in a digital format for octant display of vehicle direction is entirely conventional.

Microprocessor 75 also receives input signals from switches 38, 39, 42 and 44 through an interface circuit 8S and from temperature sensing means such as a thermistor 90 through interface circuit 92. Thermistor 90 is positioned exterior of the vehicle such as in the front grill area to measure the outside ambient air temperature.

The microprocessor includes output terminals 76 and 77 coupled to D/A converters 78 and 79, respectively. The outputs of the D/A converters are coupled to sensing coils 14 and 15 through resistors 81 and 83, respectively, to provide correction signals to the sensor 13, as described below. A detailed description of the operation of the bandpass filters and synchronous phase detectors to provide direction representative signals is presented in U.S. patent application entitled ELECTRICAL COMPASS, Ser. No. 353,896, filed on Mar. 2, 1982, now U.S. Pat. No. 4,424,631, issued Jan. 1, 1984 while a description of the compensation circuit operation is described in U.S. patent application entitled ELECTRICAL CONTROL SYSTEM, Ser. No. 478,364, filed on Mar. 24, 1983, the disclosures of which are incorporated herein by reference. Having described the overall circuit arrangement by which the microprocessor 75 receives direction indicating signals from the flux-gate sensor 13 and provides a compass output display therefrom and provides correction information through D/A converters 78 and 79 to the flux-gate sensor as well as receives and processes temperature information, a detailed description of the mounting structure for the flux-gate sensor 13 is presented in connection with FIGS. 3–11.

Figure 3:
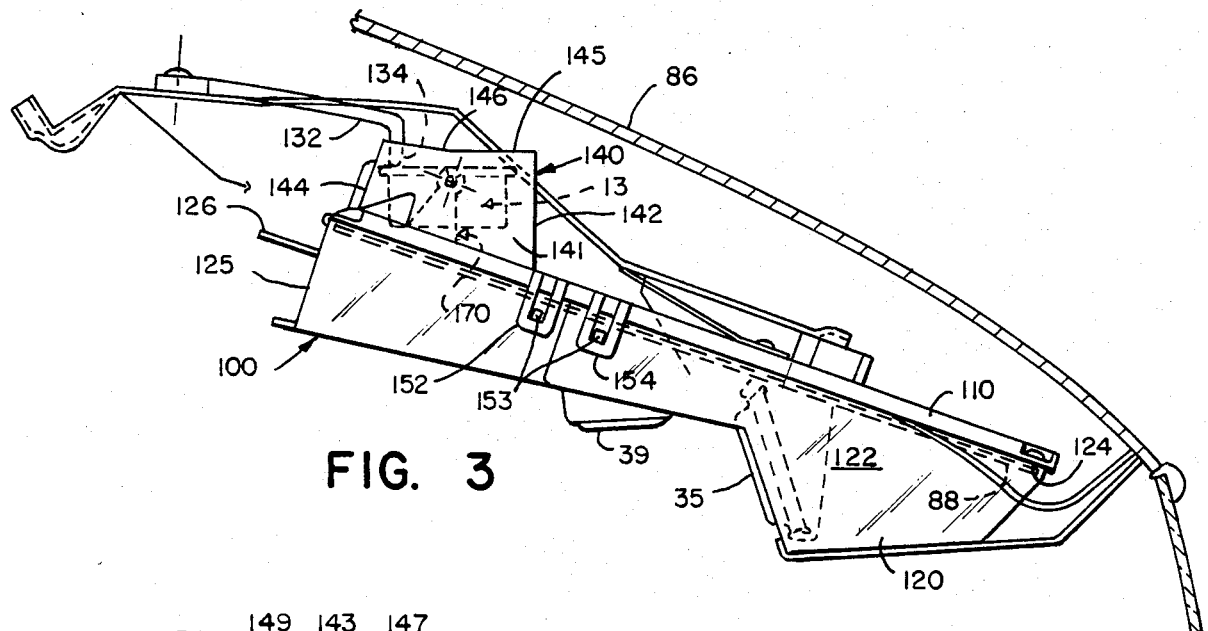
FIG. 3 is a fragmentary, right-side elevational view, partly in phantom form, of an installed housing assembly embodying the present invention.
Figure 4:
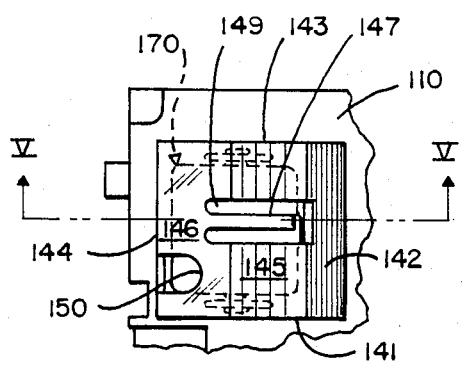
FIG. 4 is a fragmentary, top plan view of a portion of the structure shown in FIG. 3.
Figure 5:
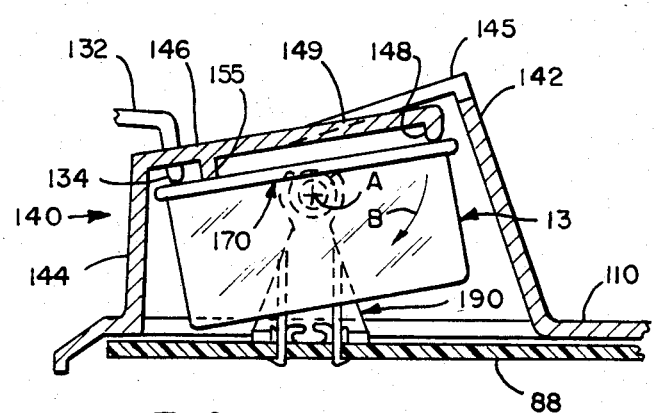
FIG. 5 is a fragmentary, cross-sectional view taken along section line V—V of FIG. 4.
Figure 6:
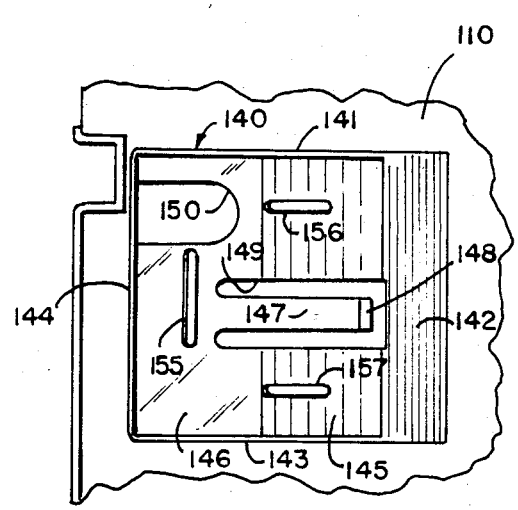
FIG. 6 is a fragmentary, bottom plan view of the structure shown in FIG. 4.

Referring initially to FIG. 3, there is shown the housing assembly 100 of the present invention in which the circuit board 88 is mounted. Housing 100 includes an upper section 110 and lower section 120. Each of the sections are molded of a suitable polymeric material such as polycarbonate with the upper section 100 being mounted to a bracket 130 which, in turn, is secured to the sheet metal roof 86 of the vehicle by conventional fasteners. Lower section 120 includes a forward portion 120a and a rearward portion 120b. Portions 120a and 120b have bottom surfaces 121a and 121b, respectively, offset from one another with the riser 123 extending therebetween and forming the display panel on which the digital display 35 is mounted. Circuit board 88 includes all of the circuitry shown in FIG. 2 which is positioned on the generally T-shaped board in a conventional fashion. Upper housing 110 includes a generally rectangular, upwardly extending housing compartment 140 which encloses the flux-gate sensor 13 and a cradle mounting structure 170, described in greater detail below. Compartment 140 includes a forward inclined wall 142, sidewalls 141 and 143, rear wall 144 and a segmented upperwall comprising two integrally joined surfaces 145 and 146. Integrally formed in the forward extending upper wall section 145 is a spring arm 147 including a downwardly depending tip 148 (FIG. 5). The resilient arm 147 is formed by a U-shaped aperture 149 surrounding the three sides of the arm 147 which is cantilevered from and integrally joined to the rear surface 146 of the top wall. A rounded slot 150 is formed in the top near the corner, as best seen in FIGS. 4 and 6. Arm 147 and slot 150 formed in the upper housing 110 operate in connection with the downwardly depending arm 132 of bracket 130 including tip end 134 extending through slot 150 in cooperation with the cradle mounting assembly 170 to align the flux-gate sensor 13 in a generally horizontal plane regardless of the vehicle in which the compass is installed, as described in greater detail below.

The upper housing assembly includes a pair of downwardly depending snap-catches 152 and 154 on each slide which are generally U-shaped members which snap-fit over catch blocks 153 formed on the sidewall 122 of the lower housing 120 on each side. The peripheral flange of the upper edge of housing 120 corresponds in shape and aligns and mates with the peripheral flange of upper housing 110 such that the two structures interfit, as shown in FIG. 3. Housing 120 includes suitable, integrally molded lands to which the printed circuit board 88 is secured and housing 110 includes a plurality of apertures 124 which permit fastening devices such as screws to extend through the assembled housing halves and attach the structure to bracket 130 which, in turn, is secured to the sheet metal roof 86 of the vehicle by suitable fastening screws in a conventional manner. The rear wall 125 of lower housing 120 includes an aperture through which there extends a plurality of electrical contacts 126 forming a male pin connector which extends into a corresponding female socket for providing operating power to the circuit board 88. This construction permits easy assembly and removal of circuit board 88 by simply snapping or releasing catches 152 and 154.

The floor of the inner under surface of top walls 145 and 146 of housing 140 is shown in FIG. 6 and includes a rear laterally extending upperwardly projecting land 155 forming an indexing support for the rear surface of the platform 180 of the cradle assembly and a pair of laterally spaced longitudinally extending side lands 156 and 157 which define stops against the pivotal motion of the cradle assembly in the forward direction. The operation of the cradle assembly in connection with compartment 110 and bracket 130 will be described subsequent to the description of the elements forming the cradle assembly which now follows in connection with FIGS. 7 through 10.

Figure 8:
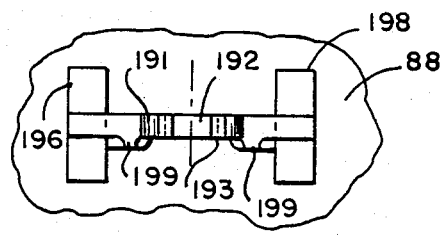
FIG. 8 is a top plan view of the structure shown in FIG. 7.
Figure 7:
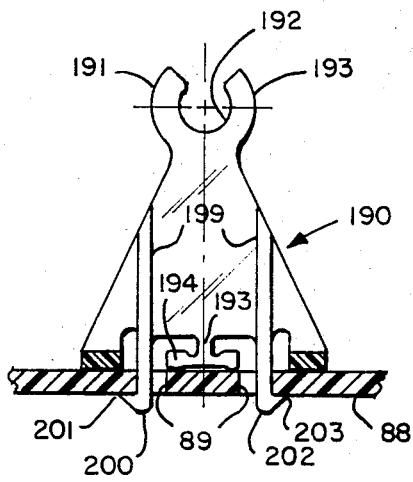
FIG. 7 is an enlarged side elevational view of a portion of the compass mounting structure shown in FIG. 3.
Figure 9:
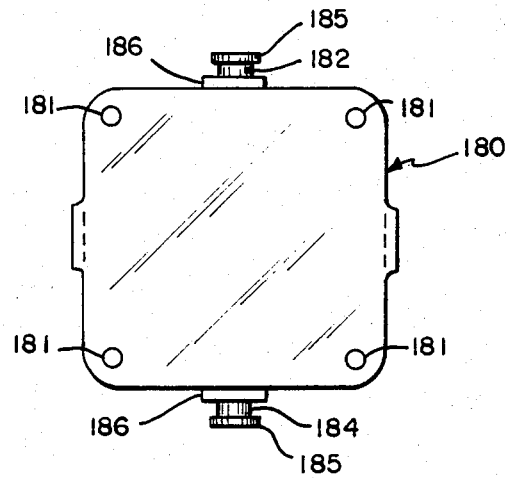
FIG. 9 is an enlarged, top plan view of a portion of the compass mounting structure shown in FIG. 3.
Figure 10:
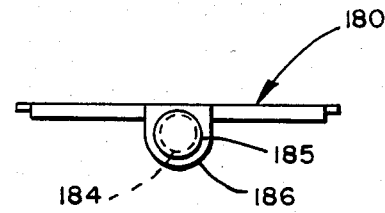
FIG. 10 is a front elevational view of the structure shown in FIG. 9.

The cradle assembly 170 comprises a generally square platform 180 (FIGS. 9 and 10) which is pivotally supported above the printed circuit board 88 by means of a pair of substantially identical legs 190 (FIGS. 8 and 9). The flux-gate sensor 13 is secured to the under side of platform 180, as best shown in FIG. 5, by four mounting apertures 181 at the corners of the platform. Extending outwardly from opposite sides of the platform are stub pivot axles 182 and 184 with a disk-shaped stop 185 capping each of the axles. Each axle extends from a downwardly depending mounting boss 186, as best seen in FIG. 10. Each of the legs 190 include a semi-spherical socket 192 defined by curved resilient legs 191 and 193 and having a width permitting the pivot axles 182 and 184 to snap-fit within the socket 192 of the aligned legs. The legs are generally triangular in side elevation, as shown in FIG. 7, and terminate in a central pad 194 which is integrally formed with the body of the leg and joined thereto by means of a center support leg 193. The pad 194 provides center pressure against the upper surface of printed circuit board 88 as do a pair of laterally extending end legs 196 and 198 which are best shown in FIG. 8. A pair of reinforcing ribs 199 extend vertically and are integrally joined with locking tabs 200 and 202 which extend below the lower surface of legs 196 and 198 and include lips 201 and 203, respectively, and which extend through apertures 89 formed in the printed circuit board and snap-lock each of the legs 190 in spaced relationship such that pivot axles 182 and 184 align with and snap into the legs 190.

Legs 190 have a height sufficient to allow the flux-gate sensor 13 mounted to the under surface of platform 180 to clear the upper surface of the circuit board, as illustrated in FIG. 3, and permit tilting of the platform and the flux-gate sensor mounted thereto through an angle of about 25 degrees about the transversly extending pivot axis A (FIG. 5) which is the center of axles 182 and 184. The pivoting of platform 180 to assure horizontal alignment of the flux-gate sensor once the assembly is installed in a vehicle is now discussed in connection with FIGS. 3, 5 and 11.

Initially, it is noted that in all installations the legs of the cradle assembly urges platform 180 into engagement with tip 148 of resilient polymeric arm 149 which is an integral portion of compartment 140 in turn integral with upper housing assembly 110. Thus, when the lower housing assembly with the circuit board is installed and snap-fitted in position, as shown in FIG. 3; as best illustrated in FIG. 5, the platform will be tilted in a clockwise direction against stop 155 to position the platform and therefore the flux-gate sensor 13 mounted thereto in a horizontal plane when installed in a vehicle.

Figure 11:
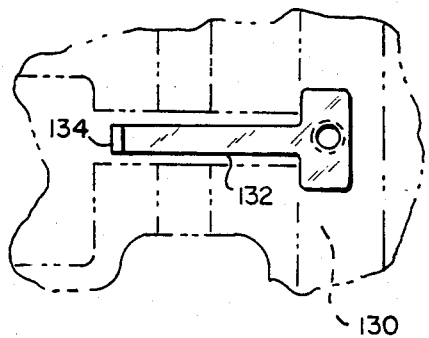
FIG. 11 is a fragmenrary, bottom plan view of a portion of the mounting structure for the present invention.

In other vehicles, where the bracket 130 attached to the headliner is inclined at a slightly different angle, of for example 10 to 15 degrees, it is desired to rotate platform 180 in a counterclockwise position from the rest position against land 155 to position the sensor horizontally. In such installations an auxiliary arm 132, as seen in FIG. 11, is secured to the aluminum bracket 130 and includes a downwardly depending tip 134 which is aligned with and projects through aperture 150 in compartment 140. This arm contacts the platform 180 at a location remote from and on an opposite side of pivot axis A such that tip 148 pivots the platform against the resilient arm 149, deflecting arm 149 upwardly. Thus, when housing assembly 100, including the circuit board and cradle assembly thereon, is installed and secured to bracket 130, arm 132 and tip 134 automatically positions platform 140 and the flux-gate sensor 13 thereon in a horizontal position for the vehicle into which the assembly is installed. Thus, by providing an arm 132 as required for particular vehicles and using a tip length 134 selected to provide the desired horizontal alignment, the housing assembly 100 of the present invention will assure automatic horizontal alignment of the flux-gate sensor when the assembly is installed in any vehicle. The housing assembly 100 including the flux-gate sensor and cradle assembly thus can be identical for all vehicles thereby facilitating manufacturing by assembly-line techniques typically employed by auto manufacturers. In any installation, the resilient arm 149 stabilizes platform 180 and flux-gate sensor mounted thereto against movement since it provides a bias force for the platform either against land 155 or a second arm 132.

Thus, the system of the present invention provides a module in which a circuit board serves as a mounting structure for a cradle assembly for pivotally mounting a flux-gate sensor. The sensor is enclosed by housing assembly attached to a mounting bracket such that the sensor is mounted adjacent the roof of the vehicle which serves to direct the magnetic flux lines of the earth's magnetic field to improve the sensor's performance while at the same time being operatively connected to a digital display that is highly visible to the driver and passengers of the vehicle. Further, such sensor will automatically be pivoted to a predetermined, aligned position when installed in a given vehicle. It will become apparent to those skilled in the art that various modifications to the preferred embodiment of the invention can be made without departing from the spirit or scope thereof as defined by the appended claims.

The embodiments of the invention in which an exclusive property or privelege is claimed are defined as follows:

1. A mounting structure for a magnetic field sensor and a display means for use in a vehicle compass system comprising:

a magnetic field sensor normally stationary with respect to a vehicle on which it is mounted for creating electrical signals in response to the position of said sensor in relation to the earth's magnetic field;

a digital display means responsive to said electrical signals for displaying the vehicle heading in response to said electrical signals;

a mounting assembly for supporting said magnetic field sensor in a pivotally adjustable position with respect to a vehicle; and means for pivoting the magnetic sensor secured to said mounting assembly to a predetermined adjusted position when said mounting assembly is attached to the vehicle, said means providing pivotal adjustment of said magnetic sensor independent of said display means whereby said mounting structure can be utilized in different vehicles by adjusting said position of said sensors independently of the position of said display means.

2. The apparatus as defined in claim 1 wherein said mounting assembly comprises a cradle assembly.

3. The apparatus as defined in claim 2 wherein said cradle assembly comprises a sensor receiving platform pivotally coupled to a pair of support legs.

4. The apparatus as defined in claim 3 wherein said platform includes pivot axle means extending from opposite sides and said legs include sockets at one end for captively receiving said pivot axle means.

5. The apparatus as defined in claim 4 wherein said legs include locking tabs at an opposite end for snap-fitting within apertures of a planar support.

6. A mounting structure for a magnetic field sensor used in a vehicle compass system comprising:

a mounting assembly for holding a magnetic field sensor in a pivotally adjustable position with respect to a vehicle;

means for pivoting the magnetic sensor secured to said mounting assembly to a predetermined adjusted position when said mounting assembly is attached to the vehicle; and said means for pivoting said magnetic sensor comprising a housing for said sensor including first arm means engaging said platform to tilt said platform to a predetermined position.

7. The apparatus as defined in claim 6 wherein said housing is shaped to hold a printed circuit board for the compass system and wherein said legs of said cradle assembly snap fit into apertures formed in said circuit board.

8. The apparatus as defined in claim 7 wherein said first arm engages said platform on a first side of said pivot axle means and wherein said housing includes a floor and an indexing land extending from said floor on a side of said platform opposite said arm and positioned to engage said platform when pivoted by said arm.

9. The apparatus as defined in claim 8 and further including a mounting bracket for said housing, said bracket adapted to be secured to the roof of a vehicle, said housing including an aperture formed therethrough and aligned with said platform on a side of said pivot axle means opposite said first arm and wherein said mounting bracket selectively includes an arm which projects into said housing through said aperture to engage said platform to align the platform in a selectively different position.

10. The apparatus as defined in claim 9 wherein said magnetic sensor is a flux-gate sensor.

11. The apparatus as defined in claim 10 wherein said arm associated with said mounting bracket is shaped to move said platform to a generally horizontal position when installed in a vehicle.

12. A mounting system for a vehicle mounted magnetic field sensor used in connection with an electrical compass system comprising:

a housing adapted to be mounted adjacent the roof of a vehicle;

mounting means for said magnetic field sensor for adjustably positioning said magnetic field sensor within said housing; said mounting means comprising a cradle assembly including a sensor receiving platform pivotally coupled to a pair of support legs for holding said magnetic field sensor in a pivotally adjustable position with respect to a vehicle and for pivoting the magnetic sensor mounted on said platform to a predetermined adjusted position when said mounting assembly is attached to the vehicle; said platform including pivot axle means extending from opposite sides and said legs including sockets at one end for captively receiving said pivot axle means; said legs including locking tab at an opposite end for snap-fitting within apertures of a planar support; and said housing for said sensor including first arm means engaging said platform to tilt said platform to a predetermined position.

13. The apparatus as defined in claim 12 wherein said housing is shaped to hold a printed circuit board for the compass system and wherein said legs of said cradle assembly snap-fit into apertures formed in said circuit board.

14. The apparatus as defined in claim 13 wherein said first arm engages said platform on a first side of said pivot axle means and wherein said housing includes a floor and an indexing land extending from said floor on a side of said platform opposite said arm and positioned to engage said platform when pivoted by said arm.

15. The apparatus as defined in claim 14 and further including a mounting bracket for said housing, said bracket adapted to be secured to the roof of a vehicle, said housing including an aperture formed therethrough and aligned with said platform on a side of said pivot axle means opposite said first arm and wherein said mounting bracket selectively includes an arm which projects into said housing through said aperture to engage said platform to align the platform in a selectively different position.

16. The apparatus as defined in claim 15 wherein said magnetic sensor is a flux-gate sensor.

17. The apparatus as defined in claim 16 wherein said arm associated with said mounting bracket is shaped to move said platform to a generally horizontal position when installed in a vehicle.

18. A mounting structure for a magnetic field sensor and a display means for use in a vehicle compass system comprising:

a module including a housing means adapted to be mounted directly under the roof of a vehicle and proximate the top edge of the vehicle's windshield;

said housing means including a forward portion adapted to be mounted proximate the windshield, and a rearward portion extending rearward of said forward portion, said forward portion having a bottom surface offset downwardly from the bottom surface of said rearward portion to produce a riser extending between the said bottom surfaces of said forward and rearward portions and facing rearwardly;

a display means;

a magnetic field sensor;

a mounting assembly for supporting said magnetic field sensor, said mounting assembly being supported by said housing whereby said assembly and sensor are mounted proximate said roof and are covered by at least one of said surfaces;

said magnetic field sensor being operatively connected to said display means for causing a digital display of the vehicle heading in response to the sensing of said sensor, said display means being mounted on said riser whereby said digital display is made easily visible to the driver and passenger of the vehicle.

19. A mounting structure for a magnetic field sensor for use in a vehicle compass system, said sensor being adapted to be operatively connected to a digital display means for displaying the vehicle heading in response to the sensing of said sensor comprising:

a portion of a roof located proximate the top edge of the vehicle's windshield;

a module including a housing means mounted under said roof portion of a vehicle;

a magnetic field flux gate sensor adapted to produce electrical signals in response to its position in the magnetic flux lines of the earth's magnetic field;

an electrical circuit for receiving electrical signals from said magnetic field sensor and having output terminals at which signals are produced for applying to a digital display means, said output terminals being adapted to be electrically connected to a digital display means for causing the display means to produce a digital display of the heading of the vehicle;

means for supporting the electrical circuit and said magnetic field sensor; said means with said magnetic field sensor and electrical circuit supported thereon being mounted within said housing means of said module whereby said magnetic field sensor is mounted under and immediately adjacent the roof of the vehicle where the magnetic flux lines of the earth's magnetic field are directed by said roof.

20. The mounting structure of claim 19 in which a digital display means responsive to said electrical signals is provided for displaying the vehicle heading in response to said electrical signals;

a mounting assembly for supporting said magnetic field sensor in a pivotally adjustable position with respect to a vehicle; and means for pivoting the magnetic sensor secured to said mounting assembly to a predetermined adjusted position when said mounting assembly is attached to the vehicle, said means providing pivotal adjustment of said magnetic sensor independent of said display means whereby said mounting structure can be utilized in different vehicles by adjusting said position of said sensors independently of the position of said display means.

21. The mounting structure of claim 19 in which a module is provided including a housing means adapted to be mounted directly under the said roof portion of the vehicle and proximate the top edge of the vehicle's windshield;

said housing means including a forward portion adapted to be mounted proximate the windshield, and a rearward portion extending rearward of said forward portion, said forward portion having a bottom surface offset downwardly from the bottom surface of said rearward portion to produce a riser extending between the said bottom surfaces of said forward and rearward portions and facing rearwardly;

a display means; and said magnetic field sensor being operatively connected to said display means for causing a digital display of the vehicle heading in response to the sensing of said sensor, said display means being mounted on said riser whereby said digital display is made easily visible to the driver and passengers of the vehicle.

* * * * *

UNITED STATES PATENT AND TRADEMARK OFFICE
CERTIFICATE OF CORRECTION

PATENT NO. : 4,505,054

DATED : March 19, 1985

INVENTOR(S) : Russell L. Clark and David E. Nestell

It is certified that error appears in the above-identified patent and that said Letters Patent is hereby corrected as shown below:

Column 1, Line 52:
"descriprion" should be --description--

Column 2, Line 12:
"fragmenrary" should be --fragmentary--

Column 2, Line 37:
"1,241,870" should be --4,241,870--

Column 3, Line 1:
"ourput" should be --output--

Column 3, Line 52:
"8S" should be --85--

Column 3, Line 64:
"providc" should be --provide--

Column 4, Line 55:
"slide" should be --side--

Column 5, Line 18:
"110" should be --140--

Column 8, Line 19, Claim 12:
"tab" should be --tabs--

UNITED STATES PATENT AND TRADEMARK OFFICE
CERTIFICATE OF CORRECTION

PATENT NO. : 4,505,054

DATED : March 19, 1985

INVENTOR(S) : Russell L. Clark and David E. Nestell

It is certified that error appears in the above-identified patent and that said Letters Patent is hereby corrected as shown below:

Column 9, Line 11, Claim 18:
"passenger" should be --passengers--

Signed and Sealed this

Thirteenth Day of August 1985

[SEAL]

Attest:

DONALD J. QUIGG

Attesting Officer   Acting Commissioner of Patents and Trademarks